United States Patent
Naito et al.

(10) Patent No.: US 9,497,633 B2
(45) Date of Patent: Nov. 15, 2016

(54) INFORMATION PROCESSING DEVICE AND WIRELESS TERMINAL DEVICE FOR REWRITING CONTRACT AUTHORIZATION INFORMATION FOR A WIRELESS SERVICE PROVIDER

(75) Inventors: Masahiko Naito, Tokyo (JP); Katsutoshi Itoh, Tokyo (JP)

(73) Assignee: SONY CORPORATION, Tokyo (JP)

( * ) Notice: Subject to any disclaimer, the term of this patent is extended or adjusted under 35 U.S.C. 154(b) by 409 days.

(21) Appl. No.: 13/280,737

(22) Filed: Oct. 25, 2011

(65) Prior Publication Data
US 2012/0117210 A1  May 10, 2012

(30) Foreign Application Priority Data

Nov. 10, 2010 (JP) ................................. 2010-251992

(51) Int. Cl.
*H04W 12/08* (2009.01)
*H04L 29/06* (2006.01)
*H04W 48/18* (2009.01)
*H04W 8/24* (2009.01)

(52) U.S. Cl.
CPC .......... *H04W 12/08* (2013.01); *H04L 63/0853* (2013.01); *H04W 48/18* (2013.01); *H04W 8/245* (2013.01)

(58) Field of Classification Search
None
See application file for complete search history.

(56) References Cited

U.S. PATENT DOCUMENTS

| 7,437,158 | B2* | 10/2008 | Russell ................. G01S 5/0252 455/426.1 |
| 2002/0100798 | A1* | 8/2002 | Farrugia et al. ............. 235/380 |
| 2008/0020755 | A1* | 1/2008 | Liu ........................ H04W 8/245 455/432.1 |
| 2009/0163175 | A1* | 6/2009 | Shi ......................... H04W 8/205 455/411 |
| 2010/0048205 | A1* | 2/2010 | Guilford et al. ........... 455/432.1 |
| 2010/0069039 | A1 | 3/2010 | Kawamura et al. |

(Continued)

FOREIGN PATENT DOCUMENTS

DE 102005005712 A1  8/2006
EP   2 076 071 A1  7/2009

(Continued)

OTHER PUBLICATIONS

Extended European Search Report issued Mar. 26, 2012 in Patent Application No. 11185441.0.

(Continued)

*Primary Examiner* — Farid Homayounmehr
*Assistant Examiner* — Henry Tsang
(74) *Attorney, Agent, or Firm* — Chip Law Group

(57) ABSTRACT

An information processing device includes: a selection unit that selects a second wireless provider used when an application service is provided to a wireless terminal device on the basis of a connection request transmitted from the wireless terminal device storing contract authorization information of a first wireless provider constituting a plurality of wireless providers providing a wireless connection service through a wireless line, the connection request being based on a user operation for using the application service, from the plurality of wireless providers on the basis of the content of the application service and a position of the wireless terminal device; and a control unit that controls rewriting instruction information for rewriting contract authorization information stored in the wireless terminal device into contract authorization information of the second wireless provider to be transmitted to the wireless terminal device.

16 Claims, 10 Drawing Sheets

(56) References Cited

U.S. PATENT DOCUMENTS

2010/0311402 A1* 12/2010 Srinivasan et al. ........ 455/418
2010/0311404 A1   12/2010 Shi et al.

FOREIGN PATENT DOCUMENTS

| JP | 2007-134797 A | 5/2007 |
| JP | 2008-210301 | 9/2008 |
| WO | 02067563 A1 | 8/2002 |
| WO | WO 2008/096702 A1 | 8/2008 |
| WO | WO 2010/144471 A1 | 12/2010 |

OTHER PUBLICATIONS

Office Action issued Apr. 22, 2014 in Japanese Patent Application No. 2010-251992 (with English language translation).

Chinese Office Action issued on Aug. 4, 2015 in patent application No. 201110343435.2.

* cited by examiner

FIG. 3

| | PROVIDER NAME | CORRESPONDING REGION | USAGE FEE INFORMATION | LINE QUALITY INFORMATION | CONGESTION DEGREE INFORMATION |
|---|---|---|---|---|---|
| | 291 | 292 | 293 | 294 | 295 |
| 1 | FIRST WIRELESS PROVIDER | ... | INEXPENSIVE | SLOW | GOOD |
| 2 | SECOND WIRELESS PROVIDER | ... | EXPENSIVE | FAST | CONGESTION |

290

INFORMATION PROCESSING DEVICE AND WIRELESS TERMINAL DEVICE FOR REWRITING CONTRACT AUTHORIZATION INFORMATION FOR A WIRELESS SERVICE PROVIDER

BACKGROUND

The present disclosure relates to an information processing device, and more particularly, to an information processing device providing an application service, a wireless terminal device using the application service, an information processing system configured by the same, and an information processing method therein.

Hitherto, wireless terminal devices connected to a public wireless network have come into wide use. For example, wireless terminal devices such as mobile phone devices and terminal devices only for data communication have been known as mobile wireless terminal devices. In addition, wireless terminal devices for collecting data of automatic vending machines have been known as stationary wireless terminals.

Recently, a number of wireless providers exist in various countries and regions, as wireless providers providing a wireless connection service to wireless terminal devices.

To connect the wireless terminal device to the public wireless network, it is necessary that a card (a card (a so-called UICC card) storing contract authentication information) issued by the wireless provider providing the wireless connection service be installed in the wireless terminal device. In addition, a technique of using the card (UICC card) installed in the wireless terminal device as described above to store other information has been proposed.

For example, a communication system of adding a credit function of handling electronic money, or a mass storage memory card function with a USIM function of handling subscriber information, to the UICC card has been proposed (e.g., see Japanese Unexamined Patent Application Publication No. 2008-210301).

SUMMARY

In the related art, since the credit function or the mass storage memory card function are added to the UICC card with the USIM function, various services related to the wireless terminal device may be integrated on the UICC card.

However, in the related art described above, when the wireless terminal device receives the wireless connection service, only the wireless connection service through the wireless provider issuing the UICC card installed in the wireless terminal device can be received except in specific cases (in case of emergency, etc.).

For example, a case is assumed of using an application service from an application service server on the wireless device. For example, there are a number of application services, and thus it is assumed that wireless providers suitable for application services are changed and used according to the kind. However, when the wireless provider is changed as described above, it is necessary to replace the UICC card installed in the wireless terminal device with an UICC card issued by the wireless provider to be changed on the wireless terminal device. However, a case is assumed where a user does not have the UICC card issued by the wireless provider to be changed. Even when the user has the UICC card issued by the wireless provider to be changed, the replacing work is complicated.

It is desirable to easily use a wireless provider suitable for an application service when using the application service.

According to a first embodiment of the present disclosure, there are provided an information processing device including: a selection unit that selects a second wireless provider used when an application service is provided to a wireless terminal device on the basis of a connection request transmitted from the wireless terminal device storing contract authorization information of a first wireless provider constituting a plurality of wireless providers providing a wireless connection service through a wireless line, the connection request being based on a user operation for using the application service, from the plurality of wireless providers on the basis of the content of the application service and a position of the wireless terminal device; and a control unit that controls rewriting instruction information for rewriting contract authorization information stored in the wireless terminal device into contract authorization information of the second wireless provider to be transmitted to the wireless terminal device, an information processing method thereof, and a program for causing a computer to execute the method. With such a configuration, the second wireless provider used when providing the application service to the wireless terminal device is selected on the basis of the connection request transmitted from the wireless terminal device through the wireless line, and the rewriting instruction information for rewriting the contract authorization information stored in the wireless terminal device into the contract authorization information of the second wireless provider is controlled to be transmitted to the wireless terminal device.

In the first embodiment, after the contract authorization information stored in the wireless terminal device is rewritten into the contract authorization information of the second wireless provider, the control unit may control the instruction information of transmitting the connection request to be transmitted as the rewriting instruction information to the wireless terminal device by reconnection to the wireless line provided by the second wireless provider using the contract authorization information of the second wireless provider. With such a configuration, after the contract authorization information stored in the wireless terminal device is rewritten into the contract authorization information of the second wireless provider, the instruction information of transmitting the connection request is controlled to be transmitted as the rewriting instruction information to the wireless terminal device by the reconnection to the wireless line provided by the second wireless provider using the contract authorization information of the second wireless provider.

In the first embodiment, the control unit may control the rewriting instruction information to be transmitted from the wireless line provided by the first wireless provider to the wireless terminal device through the second wireless provider. With such a configuration, the rewriting instruction information is controlled to be transmitted from the wireless line provided by the first wireless provider through the second wireless provider to the first wireless provider.

In the first embodiment, the connection request may include the position information acquired by the wireless terminal device or a position information corresponding to the position of a base station connected to the wireless terminal device, and the selection unit may specify the position of the wireless terminal device on the basis of the position information included in the connection request, may extract wireless providers capable of providing the wireless connection service at the specified position from the plurality of wireless providers, and may select the second wireless provider from the extracted wireless providers. With such a configuration, the position of the wireless terminal device is specified on the basis of the position information included in the connection request, the wireless providers capable of providing the wireless connection service are extracted in the degree value, and the second wireless provider is selected from the extracted wireless providers.

In the first embodiment, the selection unit may select the second wireless provider from the extracted wireless providers on the basis of at least one of the cost related to the wireless connection service provided by the extracted wireless providers, wireless connection quality related to the wireless connection service, and the congestion degree related to the wireless connection service, and the content of the application service. With such a configuration, the second wireless provider is selected from the extracted wireless providers on the basis of at least one of the cost related to the wireless connection service provided by the extracted wireless providers, the wireless connection quality related to the wireless connection service, and the congestion degree related to the wireless connection service, and the content of the application service.

In the first embodiment, the application service may be at least one of a sound transmission service, an image transmission service, a web service, an e-mail service, a data download service, a data upload service, and a network game. With such a configuration, at least one thereof is provided to the wireless terminal device on the basis of the connection request transmitted from the wireless terminal device through the wireless line.

In the first embodiment, the information processing device may be an application service server providing an application service to the wireless terminal device through the wireless line or an aggregator performing change of communication paths of the plurality of wireless providers. With such a configuration, the application service server or the aggregator selects the second wireless provider, and the rewriting instruction information is controlled to be transmitted to the wireless terminal device.

According to a second embodiment of the present disclosure, there is provided a wireless terminal device including: a storage unit that stores contract authorization information of a first wireless provider constituting a plurality of wireless providers providing wireless connection services; a first control unit that transmits a connection request based on an user operation for using the application service to an information processing device providing the application service through a wireless line using the contract authorization information of the first wireless provider; and a second control unit that rewrites the contract authorization information stored in the storage unit into the contract authorization information of a second wireless provider when receiving rewriting instruction information for rewriting the contract authorization information stored in the storage unit into the contract authorization information of the second wireless provider selected from the plurality of wireless providers used when providing the application service, and transmits a connection request by reconnection to the wireless line provided by the second wireless provider using the contract authorization information of the second wireless provider after the rewriting, a control method thereof, and a program for causing a computer to execute the method. With such a configuration, when the connection request based on the user operation for using the application service is transmitted to the information processing device through the wireless line using the contract authorization information of the first wireless provider and the rewriting instruction information is received, the contract authorization information stored in the storage unit is rewritten into the contract authorization information of the second wireless provider and the connection request is transmitted by the reconnection to the wireless line provided by the second wireless provider using the contract authorization information of the second wireless provider after the rewriting.

According to a third embodiment of the present disclosure, there is provided a communication system including: a wireless terminal device that includes a storage unit storing contract authorization information of a first wireless provider constituting a plurality of wireless providers providing wireless connection services, and a control unit transmitting a connection request based on a user operation for using an application service to an information processing device providing the application service through a wireless line using the contract authorization information of the first wireless provider; and an information processing device that includes a selection unit selecting a second wireless provider used when the application service is provided to the wireless terminal device when receiving the connection request on the basis of a content of the application service and the position of the wireless terminal device, and a control unit controlling rewriting instruction information for rewriting the contract authorization information stored in the wireless terminal device into contract authorization information of the second wireless provider to be transmitted to the wireless terminal device, a processing method thereof, and a program for causing a computer to execute the method. With such a configuration, when the wireless terminal device transmits the connection request based on the user operation for using the application service to the information processing device through the wireless line using the contract authorization information of the first wireless provider and the information processing device receives the connection request, the second wireless provider is selected and the rewriting instruction information is controlled to be transmitted to the wireless terminal device.

According to the present disclosure, there is an excellent advantage that it is possible to easily use the wireless provider suitable for the application service when using the application service.

BRIEF DESCRIPTION OF THE DRAWINGS

FIG. 3 is a diagram schematically illustrating a wireless provider database in the first embodiment of the present disclosure.

DETAILED DESCRIPTION OF EMBODIMENTS

Hereinafter, embodiments for embodying the present disclosure (hereinafter, referred to as embodiments) will be described. The description is performed in the following order.

1. First Embodiment (Communication Control: an example in which an application service server selects an optimal wireless provider)
2. Second Embodiment (Communication Control: an example in which an aggregator selects an optimal wireless provider)

1. First Embodiment

Example of Configuration of Communication System

Figure 1:
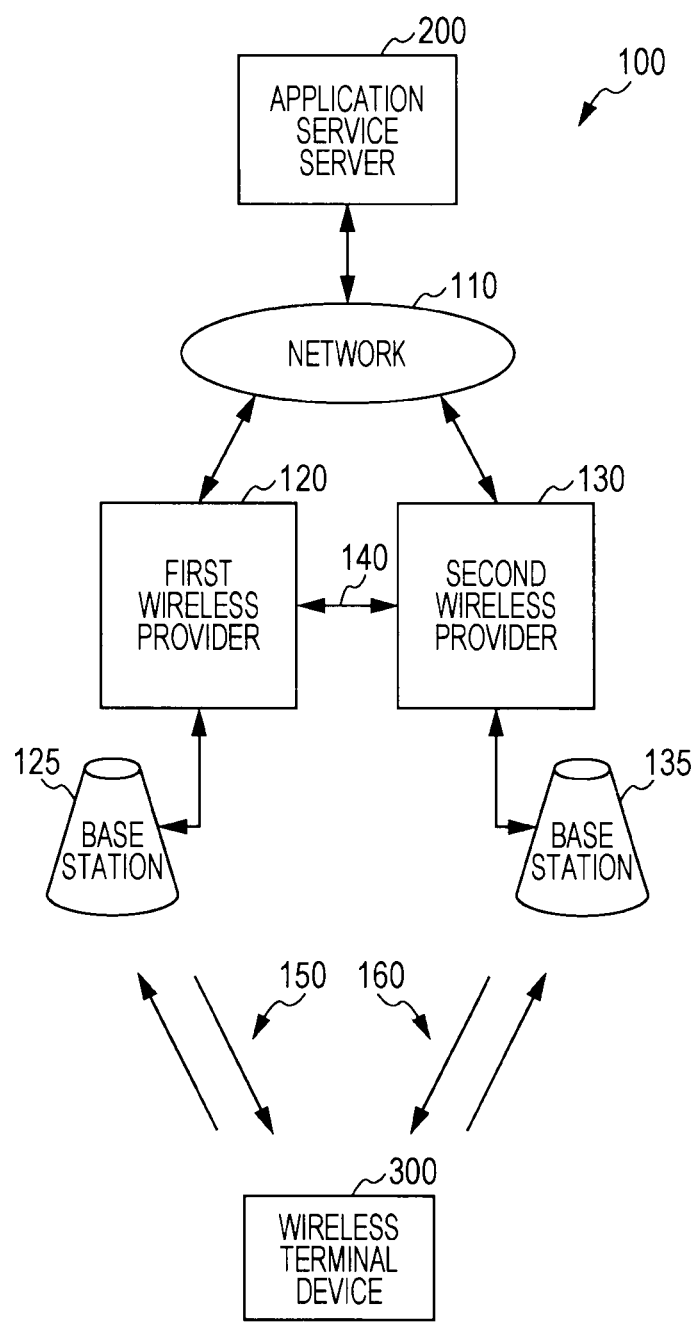
FIG. 1 is a block diagram illustrating an example of a system configuration of a communication system in a first embodiment of the present disclosure.

FIG. 1 is a block diagram illustrating an example of a system configuration of a communication system 100 in a first embodiment of the present disclosure.

The communication system 100 includes a network 110, a first wireless provider 120, a base station 125, a second wireless provider 130, a base station 135, an application service server 200, and a wireless terminal device 300.

In the communication system 100, the first wireless provider 120, and the second wireless provider 130, and the application service server 200 are connected to each other through the network 110. In addition, the network 110 is a communication network such as a telephone network, the Internet, and a local network. In addition, the first wireless provider 120 and the second wireless provider 130 are connected by the communication line such as the telephone network, the Internet, and the local network, or a communication line 140 such as a dedicated line.

The wireless terminal device 300 is connected to the base station 125 through the wireless line 150, and is connected to the first wireless provider 120 through the base station 125. Similarly, the wireless terminal device 300 is connected to the base station 135 through the wireless line 160, and is connected to the second wireless provider 130 through the base station 135. The wireless terminal device 300 is connectable to the application service server 200 through any one of the first wireless provider 120 and the second wireless provider 130.

The first wireless provider 120 stores USIM (Universal Subscriber Identity Module) information (contract authorization information) for transmission to the wireless terminal device 300 receiving the wireless connection service provided by the first wireless provider 120. The USIM information is an example of the contract authorization information, and the contract authorization information includes subscriber information of telephones and information of authentication. The first wireless provider 120 transmits the rewriting instruction information for rewriting the USIM information to the wireless terminal device 300 according to a USIM information transmission request from the application service server 200. Similarly, the second wireless provider 130 stores the USIM information to be transmitted to the wireless terminal device receiving the wireless connection service provided by the second wireless provider 130. The second wireless provider 130 transmits the rewriting instruction information to the wireless terminal device 300 according to the USIM information transmission request from the application service server 200. In the first embodiment of the present disclosure, for convenience of description, various communication devices provided in the wireless provider are schematically shown by blocks (the first wireless provider 120 and the second wireless provider 130) to which the names of the wireless providers are given.

Example of Configuration of Application Service Server

Figure 2:
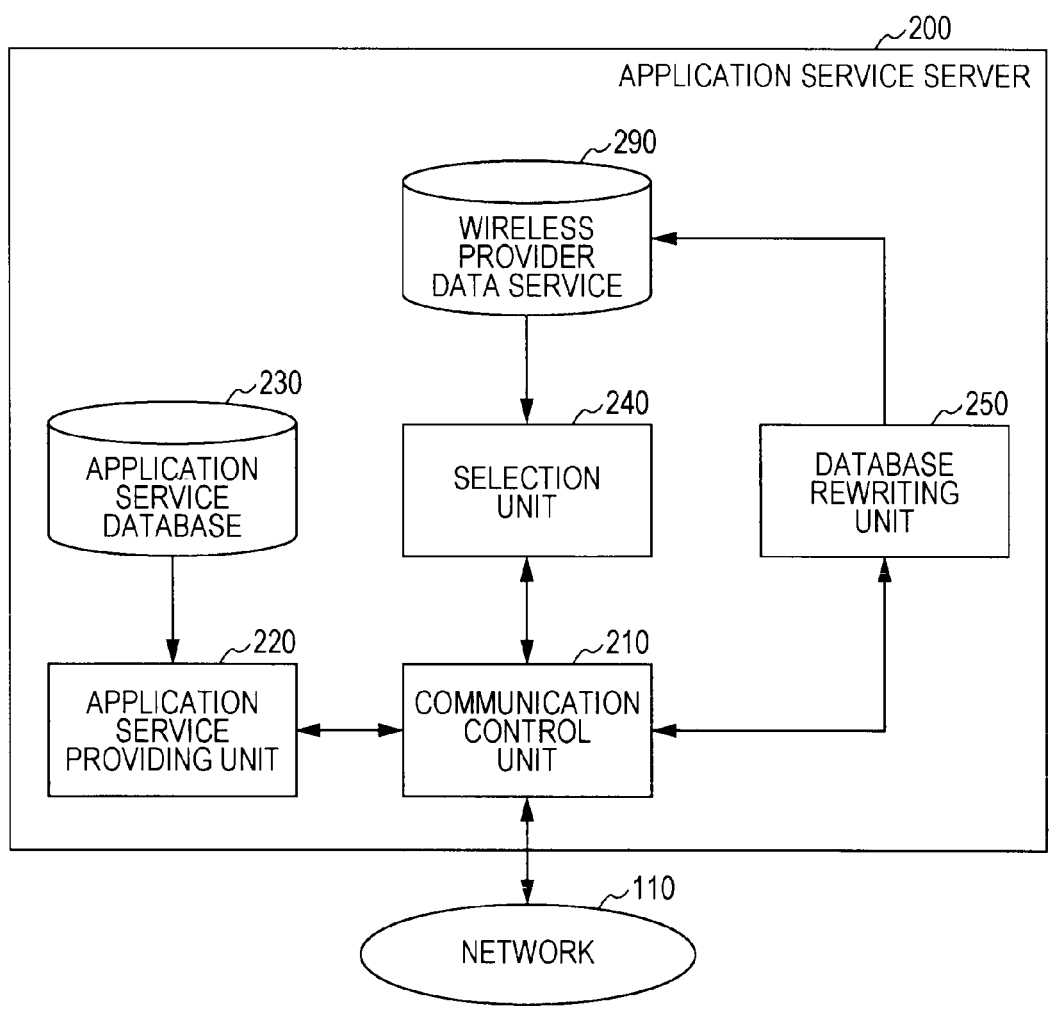
FIG. 2 is a block diagram illustrating an example of a functional configuration of an application service server in the first embodiment of the present disclosure.

FIG. 2 is a block diagram illustrating an example of a functional configuration of the application service server 200 in the first embodiment of the present disclosure.

The application service server 200 includes a communication control unit 210, an application service providing unit 220, an application service database 230, a selection unit 240, a database rewriting unit 250, and a wireless provider database 290. The application service server 200 is an information processing device providing various application services through the network 110, and provides the application service to the wireless terminal device 300 through the wireless line. For example, the application service server 200 provides services such as a sound transmission service, an image transmission service, a web service, an e-mail service, a data download service, a data upload service, and a network game.

The communication control unit 210 is connected to the network 110, and performs a control about communication performed with respect to communication devices connected through the network 110. The communication control unit 210 is an example of the control unit described in Claims.

The application service providing unit 220 provides various application services according to the requests from the communication devices connected through the network 110. The application service providing unit 220 uses various kinds of data stored in the application service database 230 when providing application service.

The application service database 230 stores various kinds of data used when the application providing unit 220 provides the application services. For example, the content that is a download target, the content for providing a game, and the like are stored in the application service database 230.

When the connection request from the wireless terminal device 300 for using the application service can be received, the selection unit 240 selects an optimal wireless provider when the application service is provided, and outputs the selection result to the communication control unit 210. Specifically, the communication control unit 210 receives the connection request (the connection request based on the user operation for using the application service) transmitted from the wireless terminal device 300 through the wireless line. When the communication control unit 210 receives the connection request, the communication control unit 210 outputs the position information included in the connection request and the content of the related application service to the selection unit 240. In addition, the position information is the position information acquired by the wireless terminal device 300 or the position information corresponding to the position of the base station connected to the wireless terminal device 300.

Subsequently, the selection unit 240 specifies the position of the wireless terminal device 300, and extracts wireless providers capable of providing the wireless connection service format the specified position among the plurality of wireless providers. Subsequently, the selection unit 240 selects the wireless provider optimal when providing the application service among the extracted wireless providers, on the basis of the content of the application service. For example, the optimal wireless provider is selected on the basis of the information about the wireless connection service provided by the extracted wireless providers and the content of the application service. As the information about the wireless connection service, for example, at least one of the cost related to the wireless connection service provided by the wireless provider, the wireless connection quality related to the wireless connection service provided by the wireless provider, and the congestion degree related to the wireless connection service provided by the wireless provider is used.

The communication control unit 210 controls the rewriting instruction information for rewriting the USIM information stored in the wireless terminal device 300 into USIM information of the wireless provider selected by the selection unit 240 to be transmitted to the wireless terminal device 300. Specifically, the communication control unit 210 controls the rewriting instruction information to be transmitted from the wireless provider connected to the wireless terminal device 300 to the wireless terminal device 300 through the wireless provider selected by the selection unit 240. In addition, the rewriting instruction information includes the instruction information to transmit the connection request by the reconnection to the wireless line provided by the wireless provider selected by the selection unit 240 using the contract authorization information of the wireless provider after the rewriting is completed.

The database rewriting unit 250 rewrites the recorded content of the wireless provider database 290 on the basis of the wireless provider information (various kinds of information related to the wireless providers) acquired from the wireless providers. For example, the database rewriting unit 250 rewrites the content of the congestion degree information 295 (shown in FIG. 3) on the basis of usage situations or the like (e.g., the usage ratio of wireless channels in the base station of the wireless provider) acquired from the wireless providers.

The wireless provider database 290 is a database storing various kinds of information (wireless provider information) about the wireless provider providing the wireless connection service to the wireless terminal device 300. In addition, the wireless provider information stored in the wireless provider database 290 will be described in detail with reference to FIG. 3.

Example of Configuration of Wireless Provider Database

FIG. 3 is a diagram schematically illustrating the wireless provider database 290 in the first embodiment of the present disclosure.

A provider name 291, a corresponding region 292, usage fee information 293, line quality information 294, and congestion degree information 295 are associated and recorded in the wireless provider database 290.

The name of the wireless provider providing the wireless connection service is stored in the provider name 291. For example, the names of the first provider 120 and the second wireless provider 130 shown in FIG. 1 are stored in the provider name 291. In FIG. 3, for convenience of description, only the wireless provider information about the first wireless provider 120 and the second provider 130 is shown, and the description about the other wireless provider information is omitted.

Information about a region (a service available region) where the wireless provider can provide the wireless connection service is stored in the corresponding region 292. For example, the position information (e.g., data representing the latitude and longitude corresponding to vertexes of a polygon corresponding to the service available region) for specifying the service available region is stored in the corresponding region 292. In FIG. 3, for convenience of description, the description about the detailed position information is omitted.

A usage fee related to the wireless connection service provided by the wireless provider is stored in the usage fee information 293. For example, a usage fee per unit of time is stored in the usage fee information 293. In FIG. 3, for convenience of description, only "inexpensive" and "expensive" are shown as the usage fee, and the description of the detailed values is omitted.

Information representing the quality of the wireless line related to the wireless connection service provided by the wireless provider is stored in the line quality information 294. For example, a communication speed of the wireless line is stored as the quality of the wireless line in the line quality information 294. In FIG. 3, for convenience of description, only "slow" and "fast" are shown as the communication speeds of the wireless line, and the description of the detailed values is omitted.

Information representing the congestion degree of the wireless line related to the wireless connection service provided by the wireless provider. For example, channel congestion degree information is stored as the congestion degree of the wireless line in the congestion degree information 295. The congestion degree information of the channel is, for example, information representing the usage ratio of the wireless channels in the base station of the wireless provider. In FIG. 3, for convenience of description, only "good" and "congestion" are shown as the congestion degree of the wireless line, and the description of the detailed values is omitted.

Example of Configuration of Wireless Terminal Device

Figure 4:
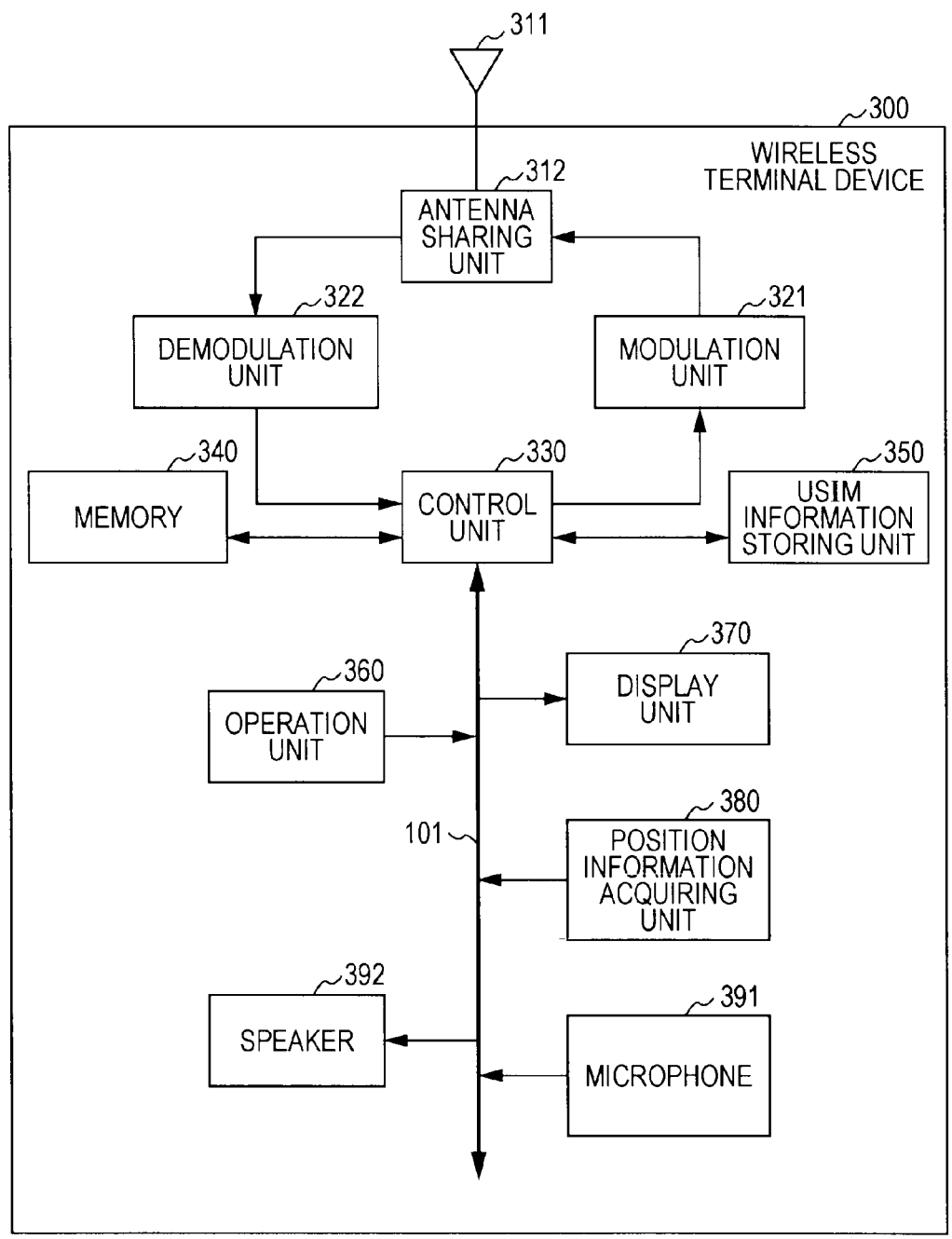
FIG. 4 is a block diagram illustrating an example of an internal configuration of a wireless terminal device in the first embodiment of the present disclosure.

FIG. 4 is a block diagram illustrating an example of an internal configuration of the wireless terminal device 300 in the first embodiment of the present disclosure.

The wireless terminal device 300 includes an antenna 311, an antenna sharing unit 312, a modulation unit 321, a demodulation unit 322, a control unit 330, a memory 340, and a USIM information storing unit 350. In addition, the wireless terminal device 300 includes an operation unit 360, a display unit 370, a position information acquiring unit 380, a microphone 391, and a speaker 392. For example, the wireless terminal device 300 is realized by a mobile phone capable of phone call and data communication.

For example, when the reception process is performed, an electric wave received by the antenna 311 is demodulated by the demodulation unit 322 through the antenna sharing unit 312, and the demodulated reception data is supplied to the control unit 330. When the reception process is an incoming call process, the demodulated reception data (sound data) is output as sound from the speaker 392 through the control unit 330.

For example, when the transmission process is performed, the transmission data output by the control unit 330 is modulated by the modulation unit 321, the modulated transmission data is transmitted from the antenna 311 through the antenna sharing unit 312. When the transmission process is an outgoing call process, the sound data input from the microphone 391 is modulated by the modulation unit 321 through the control unit 330, and the modulated transmission data (sound data) is transmitted from the antenna 311 through the antenna sharing unit 312.

The control unit 330 performs various controls on the basis of the control programs stored in the memory 340. The control unit 330 is configured by, for example, a microprocessor. For example, the control unit 330 is connected to the modulation unit 321 and the demodulation unit 322, and performs transmission and reception of various kinds of data performed to and from the application service server 200 connected through the network 110. In addition, the control unit 330 is an example of the first control unit and the second control unit described in Claims.

The memory 340 stores control programs for various controls performed by the control unit 330, transmission data, reception data, and the like. The memory 340 is configured by, for example, a ROM (Read Only Memory) or a RAM (Random Access Memory).

The USIM information storing unit 350 is a memory storing the USIM information (contract authorization information). As the USIM information storing unit 350, for example, a UICC (Universal Integrated Circuit) card may be used, and a dedicated memory for securely storing the USIM information may be used. When the UICC card is used as the USIM information storing unit 350, the USIM information is not fixedly written, but the demodulated USIM information received from the antenna 311, which is rewritable by the control unit 330, is used. The rewriting process of the USDA information may be performed by a rewriting process prescribed in 3GPP (Third Generation Partnership Project). For example, the rewriting process is performed in a mobile phone shop. The USIM information storing unit 350 is an example of the storage unit described in Claims.

The control unit 330 controls the connection request based on the user operation for using the application service to be transmitted to the application service server 200 through the wireless line using the USIM information stored in the USIM information storing unit 350. The control unit 330 receives the rewriting instruction information and rewrites the USIM information stored in the USIM information storing unit 350 into the USIM information included in the rewriting instruction information. The control unit 330 controls the connection request to be transmitted by the reconnection to the wireless line using the USIM information after the rewriting.

The operation unit 360 is an operation receiving unit receiving an operation input operated by the user, and outputs a signal according to the received operation input to the control unit 330. The operation unit 360 is provided with various keys such as numeric keys and alphabet keys, and receives a usage operation for using the application service.

The display unit 370 displays various kinds of information (text information, time information, etc.) based on the control of the control unit 330. For example, the display unit 370 displays information (game, etc.) about the application service provided from the application service server 200. As the display unit 370, for example, a display panel such as an organic EL (Electro Luminescence) panel and an LCD (Liquid Crystal Display) panel may be used. The operation unit 360 and the display unit 370 may be integrally configured using a touch panel on which a finger of the user makes contact or comes close to a display surface to perform an operation input.

The position information acquiring unit 380 acquires the position information representing the position of the wireless terminal device 300, and outputs the acquired position information to the control unit 330. The position information acquiring unit 380 may be realized by a GPS unit calculating the position information on the basis of a GPS signal received by, for example, a GPS (Global Positioning System) signal receiving antenna (not shown). The calculated position information includes data about latitude, longitude, and altitude at the time of receiving the GPS signal. In addition, a position information acquiring device that acquires the position information by another method of acquiring the position information may be used. For example, a position information acquiring device deriving the position information using access point information based on the wireless LAN (Local Area Network) present in the surroundings and acquiring the derived position information thereof may be used.

Example of Communication Among Devices

Figure 5:
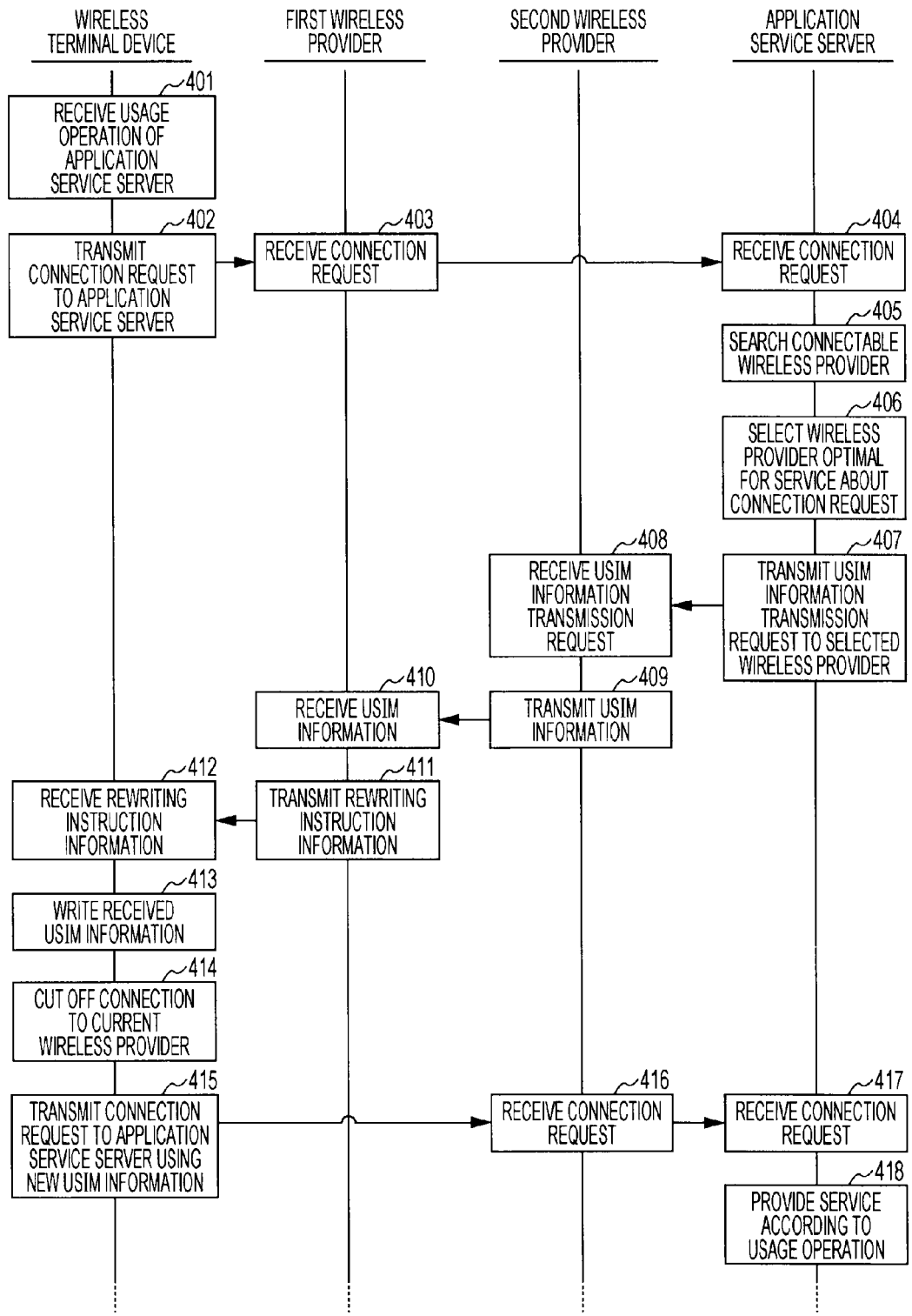
FIG. 5 is a sequence chart illustrating a communication process among devices constituting the communication system in the first embodiment of the present disclosure.

FIG. 5 is a sequence chart illustrating a communication process in the devices constituting the communication system 100 in the first embodiment of the present disclosure.

In FIG. 5, a communication process when the wireless terminal device 300 performs the connection request to the application service server 200 is described as an example. In FIG. 5, a case where the wireless terminal device 300 is connected to the first wireless provider 120 is assumed and described. In addition, in FIG. 6 and FIG. 7, the same examples are shown.

First, the user performs an operation (usage operation) of using the application service server 200 using the wireless terminal device 300 (Step 401). For example, the user displays a web page is displayed on the display unit 370 of the wireless terminal device 300 using a web browser, and the user may perform the usage operation on the web page. For example, the usage operation may be performed by a click operation on a URL (Uniform Resource Locator) of the application service server 200 on the web page. For example, an operation of receiving the download service from the application service server 200 is performed on the web page, and thus it is possible to perform the usage operation.

When the usage operation is performed by the user (Step 401), the connection request to the application service server 200 is transmitted from the wireless terminal device 300 through the first wireless provider 120 (Steps 402 to 404). The connection request includes the position information for specifying the position of the wireless terminal device 300. For example, the control unit 330 may transmit the position information acquired by the position information acquiring unit 380 and included in the connection request (Step 402). For example, the first wireless provider 120 may transmit the position information specified on the basis of the position of the base station 125 and included in the connection request transmitted from the wireless terminal device 300 (Step 403).

The connection request to the application service server 200 includes terminal identification information for identifying the wireless terminal device 300, and route information between the wireless terminal device 300 and the application service server 200. As the terminal identification information, for example, phone numbers, e-mail addresses, IMEI (International Mobile Equipment Identity) may be used. As the route information, for example, there may be adopted wireless provider identification information for identifying the wireless provider currently connected to the wireless terminal device 300.

Subsequently, when the application service server 200 receives the connection request (Step 404), wireless providers to which the wireless terminal device 300 is connectable are searched for on the basis of the position information included in the received connection request (Step 405). Specifically, the selection unit 240 searches for wireless providers to which the wireless terminal device 300 is connectable using the corresponding region 292 of the wireless provider database 290 (Step 405). For example, the selection unit 240 extracts regions including the position information included in the received connection request from the regions stored in the corresponding region 292 of the wireless provider database 290 and extracts wireless providers associated with the extracted regions. In this example, the first wireless provider 120 and the second wireless provider 130 are extracted.

Subsequently, the application service server 200 selects an optimal wireless provider when the wireless terminal device 300 uses the application service related to the connection request, from the extracted wireless providers (Step 406). Specifically, the selection unit 240 selects the optimal wireless provider using the usage fee information 293, the line quality information 294, and the congestion degree information 295 of the wireless provider database 290 from the wireless providers extracted on the basis of the position information (Step 406).

When the selection process is performed (Step 406), the selection method is changed according to the content of the application service related to the connection request. For example, when the application service related to the connection request is the content download service, it is assumed that there are a number of users who prefer inexpensiveness of the usage fee than fastness of the communication speed. When the application service related to the connection request is the content download service, the wireless provider with the most inexpensive usage fee is primarily selected. When the application service related to the connection request is the game, it is assumed that there are a number of users who prefer the fastness of the communication speed than the inexpensiveness of the usage fee. When the application service related to the connection request is the game, the wireless provider with the highest communication speed is primarily selected. In addition, the selection method is an example, and the other selection method may be used. For example, the wireless provider with the lowest congestion degree of the wireless line may be primarily selected using the congestion degree information 295 of the wireless provider database 290.

In FIG. 5, it is assumed that the application service server related to the connection request to the application service server 200 is the game. In this case, as described above, since the wireless provider with the fastest communication of the wireless line is primarily selected, the second wireless provider 130 with the fastest communication speed of the wireless line is selected (see the line quality information 294 shown in FIG. 3). In addition, when there is only one extracted wireless provider, the selection process described above is not performed, but the extracted wireless provider is selected as the optimal wireless provider.

When the selection process of the optimal wireless provider is completed (Step 406), the application service server 200 transmits the USIM information transmission request to the selected wireless provider (Step 407). For example, when the second wireless provider 130 is selected, the application service server 200 transmits the USIM information transmission request to the second wireless provider 130 (Step 407). Since the wireless provider currently connected to the wireless terminal device 300 is specified in the USIM information transmission request, the USIM information transmission request includes the terminal identification information and the route information included in the connection request from the wireless terminal device 300.

When the selected wireless provider is the same as the wireless provider (i.e., the wireless provider currently connected to the wireless terminal device 300) transmitting the connection request, the rewriting of the USIM information is not necessary, and thus the transmission of the USIM information transmission request is not necessary. In this case, the rewriting process or the like of the USIM information is not performed (Steps 407 to 417), but the application service server 200 provides the application service according to the usage operation of the user to the wireless terminal device 300 (Step 418).

The wireless provider receiving the USIM information transmission request (Step 408) transmits the USIM information for connection of the wireless terminal device 300 to the wireless provider, to the wireless terminal device 300. However, since the wireless provider receiving the USIM information transmission request is not connected to the wireless terminal device 300, the wireless provider does not directly transmit the USIM information to the wireless terminal device 300. Thus, the wireless provider receiving the USIM information transmission request (Step 408) transmits the USIM information to the wireless terminal device 300 through the wireless provider connected to the wireless terminal device 300 (Steps 409 to 412).

Specifically, the second wireless provider 130 receiving the USIM information transmission request (Step 408) transmits the USIM information to the first wireless provider 120 through the communication line 140 (Step 409). The first wireless provider 120 receiving the USIM information of the second wireless provider 130 (Step 410) transmits the rewriting instruction information including the USIM information of the second wireless provider 130 to the wireless terminal device 300 (Step 411).

The wireless terminal device 300 receiving the rewriting instruction information (including the USIM information of the second wireless provider 130) (Step 412) writes the USIM information in the USIM information storing unit 350 and performs change of the USIM information (Step 413). The wireless terminal device 300 can perform the communication through the second wireless provider 130 by the change (Step 415). That is, the wireless terminal device 300 performing the change of the USIM information (Step 413) cuts off the connection to the current connected wireless provider (the first wireless provider 120) (Step 414). Subsequently, the wireless terminal device 300 performs the connection request to the application service server 200 through the second wireless provider 130 using the new USIM information (the USIM information of the second wireless provider 130) (Steps 415 to 417).

For example, at the time of the connection request to the application service server 200 performed after the usage operation of the user (Step 402), the wireless terminal device 300 stores connection spot information representing a connection spot thereof. The wireless terminal device 300 performs the connection request to the application service server 200 using the new USIM information through the second wireless provider 130, using the connection spot information (Steps 415 to 417). The application service server 200 and the wireless terminal device 300 are connected through the second wireless provider 130 by the connection request. After the connection, the application service server 200 provides the application service according to the usage operation of the user to the wireless terminal device 300 (Step 418).

In FIG. 5, an example of performing the change of the USIM information in the wireless terminal device 300 only once at the time of the connection request to the application service server 200 is shown. However, the change of the USIM information may be performed many times. For example, after using the application service (the first service) provided by the application service server 200, a process of changing the USIM information may be performed at the time of being changed to the usage of the other application service (the second service). In addition, after using the application service provided by the application service server 200, a process of changing the USIM information may be performed at the time of being changed to the usage of the other application service provided by the other application service server.

Example of Operation of Communication System

Next, an operation of the communication system 100 in the first embodiment of the present disclosure will be described with reference to the drawings.

Example of Operation of Wireless Terminal Device

Figure 6:
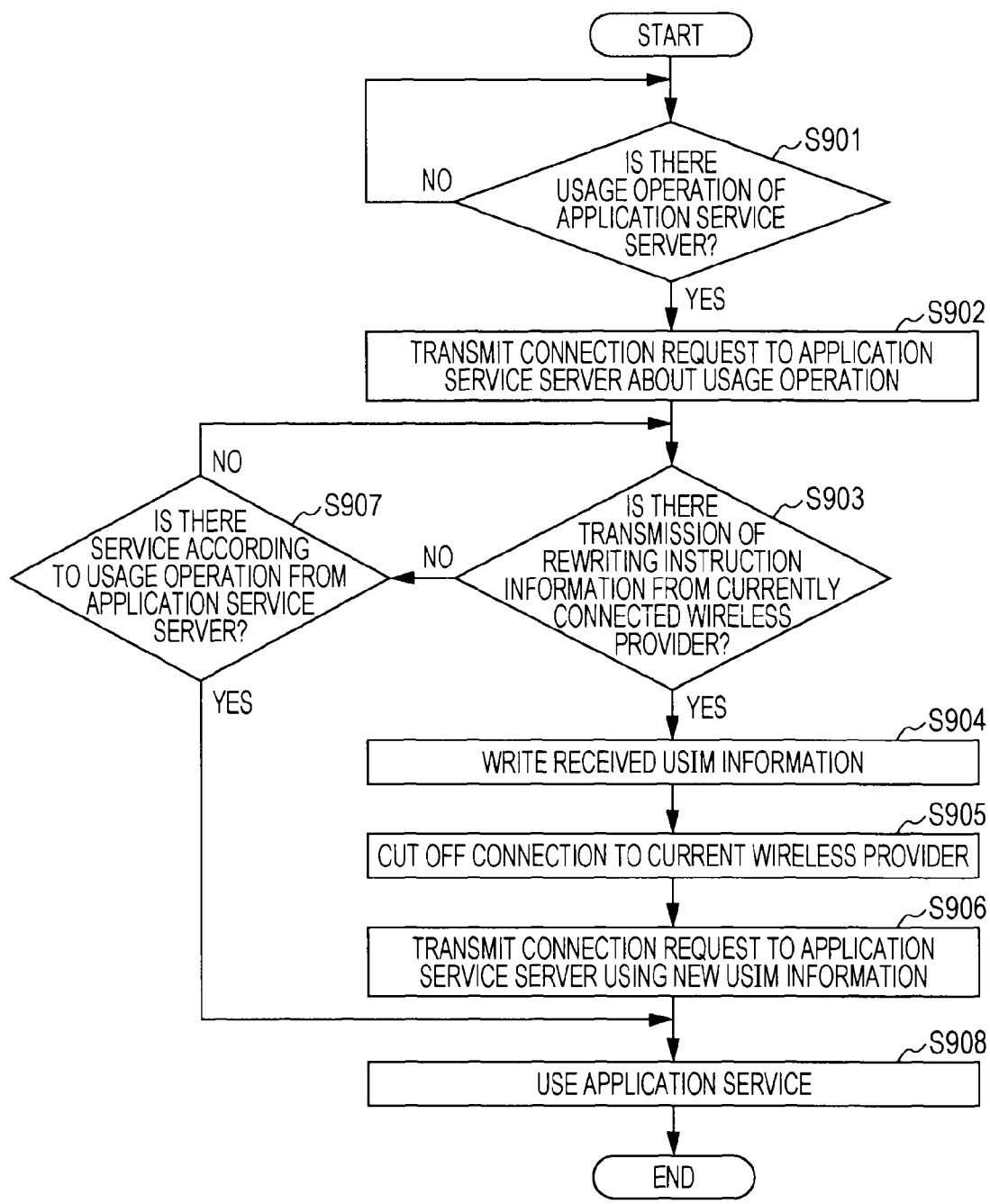
FIG. 6 is a flowchart illustrating an example of process sequence of the communication process performed by the wireless terminal device in the first embodiment of the present disclosure.

FIG. 6 is a flowchart illustrating an example of process sequence of the communication process performed by the wireless terminal device 300 in the first embodiment of the present disclosure.

First, the control unit 330 determines whether or not the operation (the usage operation) of using the application service server 200 is performed (Step S901). When the usage operation is not performed, the monitoring is continuously performed.

When the usage operation is performed (Step S901), the control unit 330 transmits the connection request to the application service server 200 to the application service server 200 through the first wireless provider 120 (Step S902). The connection request may include the position information acquired by the position information acquiring unit 380. When the connection request does not include the position information acquired by the position information acquiring unit 380, for example, the position information specified on the basis of the position of the base station 125 of the first wireless provider 120 is included in the connection request and is transmitted. The connection request includes the terminal identification information for identifying the wireless terminal device 300 as described above. The route information of connecting the wireless terminal device 300 and the application service server 200 is included in the connection request and is transmitted, by the first wireless provider 120.

Subsequently, the control unit 330 determines whether or not the rewriting instruction information is received from the connected wireless provider (the first wireless provider 120) (Step S903). In this example, an example of receiving the rewriting instruction information including the USIM information of the second wireless provider 130 is shown as the rewriting instruction information. When the rewriting instruction information is received from the connected wireless provider (the first wireless provider 120) (Step S903), the control unit 330 writes the USIM information included in the rewriting instruction information in the USIM information storing unit 350, and performs the change of the USIM information (Step S904). That is, the change from the USIM information of the first wireless provider 120 to the USIM information of the second wireless provider 130 is performed. The wireless provider 300 can perform the communication through the second wireless provider 130 by the change.

Subsequently, the control unit 330 cuts off the connection to the connected wireless provider (the first wireless provider 120) (Step S905). Subsequently, the control unit 330 transmits the connection request to the application service server 200 through the second wireless provider 130 using the new USIM information (the USIM information of the second wireless provider 130) (Step S906). When the control unit 330 performs the connection request to the application service server 200 performed after the usage operation of the user (Step S902), the memory 340 stores the connection spot information representing the connection spot. The control unit 330 performs the connection request to the application service server 200 using the new USIM information through the second wireless provider 130, using the connection spot information. Accordingly, the application service server 200 and the wireless provider 300 are connected through the second wireless provider 130. After the connection, the user can use the application service from the application service server 200 using the wireless terminal device 300 (Step S908).

When the rewriting instruction information is not received (Step S903), whether or not the application service according to the usage operation of the user is provided from the application service server 200 (Step S907) is determined. When the application service according to the usage operation of the user is not provided, the process returns to Step S903. Meanwhile, when the application service according to the usage operation of the user is provided from the application service server 200 (Step S907), the process proceeds to Step S908. That is, when the first wireless provider 120 is selected as the optimal wireless provider, the use of the application service through the first wireless provider 120 is continuously performed (Step S908).

Example of Operation of Application Service Server

Figure 7:
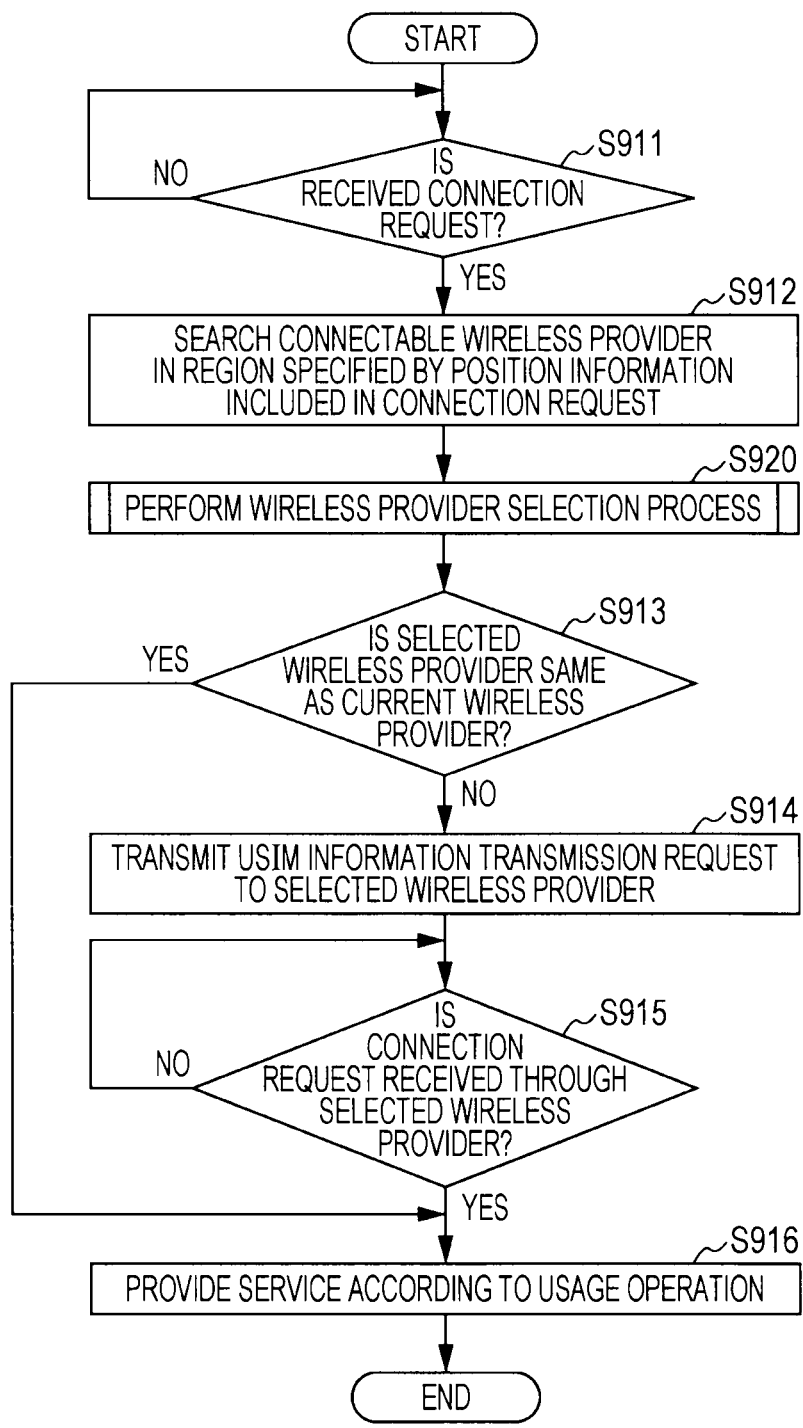
FIG. 7 is a flowchart illustrating an example of process sequence of the communication process performed by the application service server in the first embodiment of the present disclosure.

FIG. 7 is a flowchart illustrating an example of process sequence of the communication process performed by the application service server 200 in the first embodiment of the present disclosure.

First, the communication control unit 210 determines whether or not the connection request to the application service server 200 is received (Step S911). When the connection request is not received, the monitoring is continuously performed. In this example, an example of receiving the connection request to the application service server 200 from the wireless terminal device 300 is shown.

When the connection request is received (Step S911), the selection unit 240 searches for wireless providers to which the wireless terminal device 300 is able to connect on the basis of the position information included in the received connection request, and extracts the connectable wireless providers (Step S912).

Subsequently, the selection unit 240 performs the wireless provider selecting process (Step S920). The wireless provider selecting process will be described in detail with reference to FIG. 8. Steps S912 and S920 are an example of the selecting described in Claims.

Subsequently, the communication control unit 210 determines whether or not the wireless provider selected by the selection unit 240 is the same as the wireless provider connected to the wireless terminal device 300 (Step S913). When the wireless provider selected by the selection unit 240 is the same as the wireless provider connected to the wireless terminal device 300 (Step S913), it is not necessary to transmit the new USIM information to the wireless terminal device 300, and thus the process proceeds to Step S916.

When the wireless provider selected by the selection unit 240 is not the same as the wireless provider connected to the wireless terminal device 300 (Step S913), the communication control unit 210 transmits the USIM information transmission request to the wireless provider selected by the selection unit 240 (Step S914). The USIM information transmission request includes the terminal identification information and the route information included in the connection request from the wireless terminal device 300. For this reason, the wireless provider (the selected wireless provider) receiving the USIM information transmission request can specify the wireless terminal device 300 to transmit the USIM information and the path thereof. Step S914 is an example of the controlling described in Claims.

Subsequently, the communication control unit 210 determines whether or not the connection request to the application service server 200 is received from the wireless terminal device 300 through the selected wireless provider (Step S915). When the connection request is not received (Step S915), the monitoring is continuously performed. When the connection request is received (Step S915), the application service server 200 and the wireless terminal device 300 are connected through the second wireless provider 130 according to the connection request. After the connection, the application service providing unit 220 provides the application service according to the usage operation of the user to the wireless terminal device 300 (Step S916).

Figure 8:
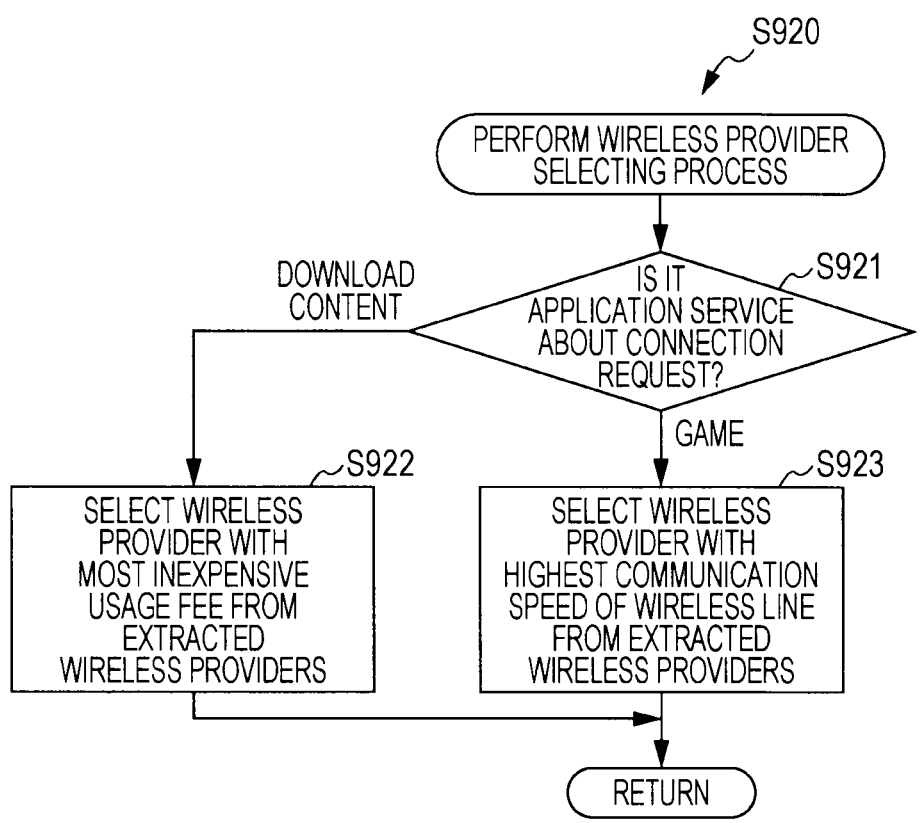
FIG. 8 is a flowchart illustrating an example of a wireless provider selecting process of the process sequence of the communication process performed by the application service server in the first embodiment of the present disclosure.

FIG. 8 is a flowchart illustrating an example of the wireless provider selecting process (Step S920 shown in FIG. 7) of the process sequence of the communication process performed by the application service server 200 in the first embodiment of the present disclosure.

First, the selection unit 240 determines the content of the application service related to the connection request to the application service server 200 from the wireless terminal device 300 (Step S921). In this example, a case where the content of the application service is any one of the content download service and the game is described as an example.

When the content of the application service related to the connection request is the content download service (Step S921), the selection unit 240 selects the wireless provider with the most inexpensive usage fee (Step S922). That is, the wireless provider with the most inexpensive usage fee is selected from the wireless providers extracted on the basis of the position information.

Meanwhile, when the content of the application service related to the connection request is the game (Step S921), the selection unit 240 selects the wireless provider with the fastest communication speed of the wireless line (Step S922). That is, the wireless provider with the fastest communication speed of the wireless line is selected from the wireless providers extracted on the basis of the position information.

As described above, according to the first embodiment of the present disclosure, when the application service provided by the application service server 200 is used in the wireless terminal device 300, the user can easily use the wireless provider suitable for the application service. That is, even when the wireless provider suitable for the application service is changed, the user does not have to change the UICC card in the wireless terminal device 300. Accordingly, the change operation is not necessary, and the user does not have to have a plurality of UICC cards. For this reason, it is possible to easily use the wireless provider suitable for the application service when using the application service.

2. Second Embodiment

In the first embodiment of the present disclosure, the example in which the application service server providing the application service selects the optimal wireless provider is shown. However, the information processing device other than the application service server may select the optimal wireless provider. In the second embodiment of the present disclosure, an example in which the information processing device other than the application service server selects the optimal wireless provider is shown. A configuration of a communication system in the second embodiment of the present disclosure is substantially the same as the example shown in FIG. 1 and the like. For this reason, the same reference numerals and signs are given to parts common with the first embodiment, and a part of the description thereof is omitted.

Example of Configuration of Communication System

Figure 9:
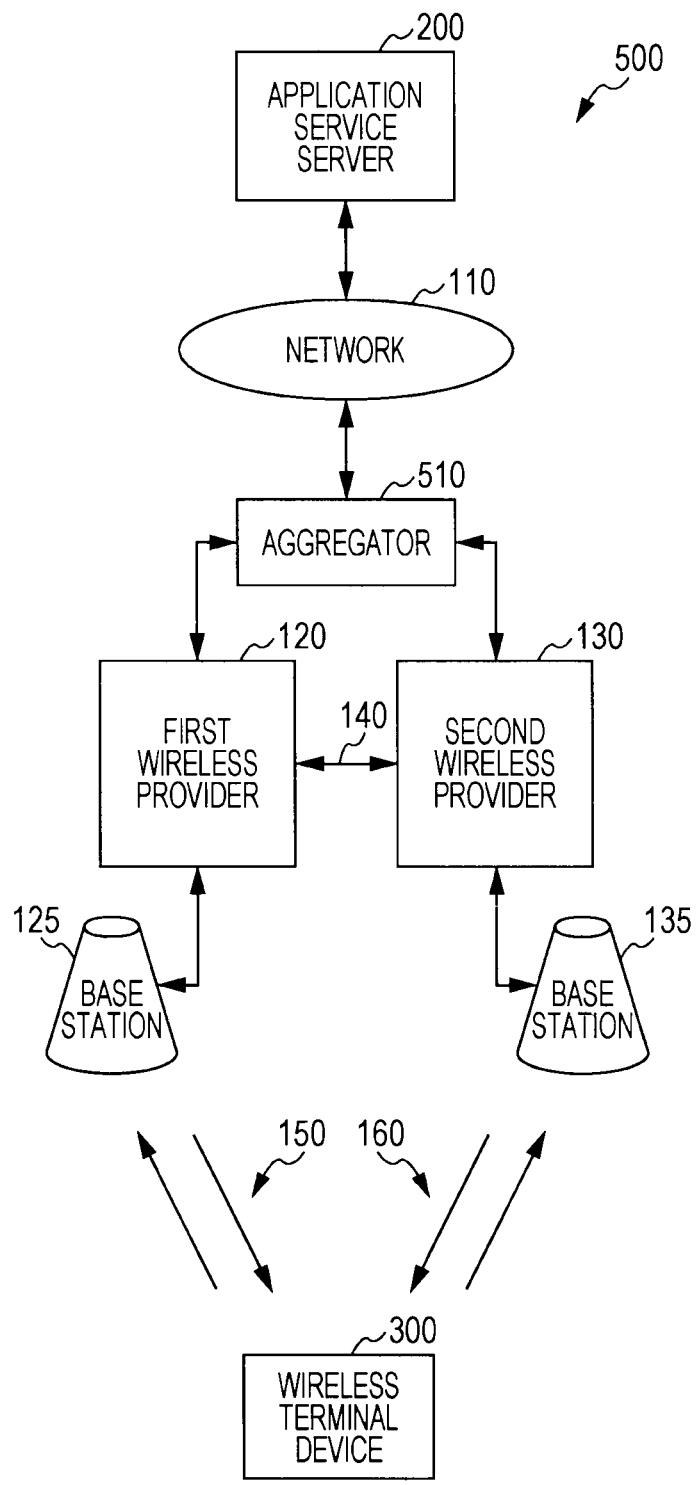
FIG. 9 is a block diagram illustrating an example of a system configuration of a communication system in a second embodiment of the present disclosure.

FIG. 9 is a block diagram illustrating an example of a system configuration of a communication system 500 in the second embodiment of the present disclosure.

The communication system 500 includes a network 110, a first wireless provider 120, a base station 125, a second wireless provider 130, a base station 135, an application service server 200, a wireless terminal device 300, and an aggregator 510.

The aggregator 510 is an information processing device connected to the network 110, the first wireless provider 120, and the second wireless provider 130. That is, the aggregator 510 performs an authorization process of a connection request from a user transmitted through the first wireless provider 120 or the second wireless provider 130, and performs connection to the network 110. The aggregator 510 performs change of a communication path of the first wireless provider 120 and the second wireless provider 130.

For example, when the connection request to the application service server 200 is transmitted from the wireless terminal device 300 to the aggregator 510 through the first wireless provider 120, the aggregator 510 performs the authorization process of the connection request. The aggregator 510 transmits the connection request to the application service server 200 through the network 110.

Subsequently, when the application service server 200 receives the connection request, the application service server 200 transmits a selection request for selecting an optimal wireless provider to the aggregator 510. At the time of transmitting the selection request, the application service server 200 transmits service information about the application service related to the connection request to the aggregator 510. For example, the service information includes content of the application service related to the connection request, a communication cost requested by the application service, and communication quality requested by the application service. The communication quality is information such as "it is preferable if the communication speed is fast" and "it is preferable if the congestion degree is low".

The aggregator 510 acquires wireless provider information from the connected wireless provider. For example, the aggregator 510 acquires the wireless provider information corresponding to the information (corresponding region 292, usage fee information 293, line quality information 294, and congestion degree information 295) stored in the wireless provider database 290 shown in FIG. 3. The aggregator 510 may store the wireless provider information in advance as the database (e.g., the wireless provider database 290 shown in FIG. 3).

The aggregator 510 acquires the position information included in the connection request related to the selection request from the application service server 200. For example, the application service server 200 may transmit the selection request including the position information to the aggregator 510. For example, when the connection request to the application service server 200 is transmitted from the wireless terminal device 300, the aggregator 510 may store the position information included in the connection request.

Subsequently, the aggregator 510 searches for a wireless provider to which the wireless terminal device 300 is connectable on the basis of the acquired position information. The search process is substantially the same as 405 shown in FIG. 5, and thus the description is omitted herein.

Subsequently, the aggregator 510 selects the wireless provider optimal when the wireless terminal device 300 uses the application service related to the connection request from the extracted wireless providers. In the selection process, the optimal wireless provider is selected using the service information acquired from the application service server 200 and the wireless provider information acquired from the wireless providers. The other part of the selection process is substantially the same as 406 shown in FIG. 5, and thus the description is omitted herein.

Subsequently, when the selection process of the optimal wireless provider is completed, the aggregator 510 transmits the USIM information transmission request to the selected wireless provider. The USIM information transmission request transmitting process is substantially the same as 407 shown in FIG. 5, and thus the description is omitted herein. In the later processes, there is a difference in that the wireless terminal device 300 performing the change of the USIM information performs the connection request using the new USIM information through the aggregator 510, but the other is substantially the same as 408 to 418 shown in FIG. 5. For this reason, the description is omitted herein.

In FIG. 9, the example where the wireless provider stores the USIM information and the wireless provider receiving the USIM information request indirectly transmits the USIM information to the wireless terminal device 300 is shown. However, the aggregator may integrally store the USIM information of the wireless provider, and the aggregator may transmit the USIM information to the wireless terminal device 300. An example thereof is shown in FIG. 10.

Example of Configuration of Communication System

Figure 10:
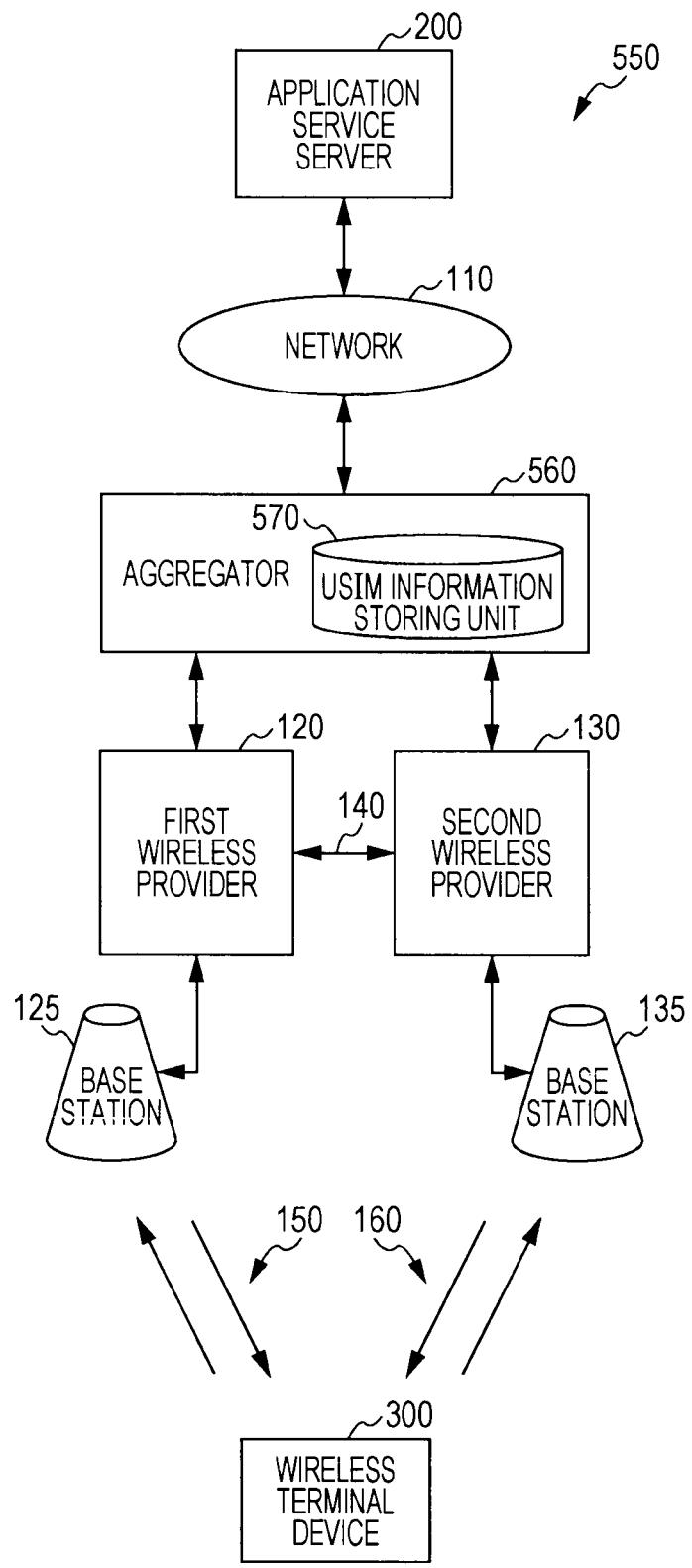
FIG. 10 is a block diagram illustrating an example of a system configuration of a communication system in the second embodiment of the present disclosure.

FIG. 10 is a block diagram illustrating an example of a system configuration of the communication system 550 in the second embodiment of the present disclosure.

The communication system 550 is a modified example of the communication system 500 shown in FIG. 9, and there is a difference in that the aggregator 560 is provided with a USIM information storing unit 570. Except that the aggregator 560 is provided with the USIM information storing unit 570, the communication system 550 is substantially the same as the communication system 500 shown in FIG. 9. Accordingly, the same reference numerals and signs are given to parts common with the communication system 500, and a part of the description is omitted.

The USIM information storing unit 570 stores the USIM information of the wireless providers (the first wireless provider 120 and the second wireless providers 130). The aggregator 560 transmits the USIM information of the optimal wireless provider selected by the selection process described above to the wireless terminal device 300. In this case, the aggregator 560 transmits the USIM information of the selected optimal wireless provider and included in the rewriting instruction information to the wireless terminal device 300 through the wireless provider connected to the wireless terminal device 300. As described above, since the aggregator 560 transmits the USIM information of the selected optimal wireless provider to the wireless terminal device 300, it is not necessary to transmit the USIM information transmission request to the selected optimal wireless provider.

In the embodiment of the present disclosure, the application service server and the aggregator have been described as the information processing device by way of example, but the embodiment of the present disclosure may be applied to the other information processing device. The embodiment of the present disclosure may be applied to a mobile wireless terminal device (e.g., a terminal device only for data communication) other than the mobile phone, a stationary wireless terminal device (e.g., a wireless terminal device for collecting data of automatic vending machines).

The embodiment of the present disclosure represents an example for embodying the present disclosure, and items in the embodiment of the present disclosure and specific items in Claims have correspondence as described in the embodiment of the present disclosure. Similarly, specific items in Claims and items in the embodiment of the present disclosure to which the same names as them are given have correspondence. However, the present disclosure is not limited to the embodiments, but may be embodied by various modifications of the embodiments within the scope of the concept of the present disclosure.

The process sequence described in the embodiment of the present disclosure may be recognized as a method having a series of sequences, and may be recognized as a program for causing a computer to execute the series of sequences, or a recording medium storing the program. As the recording medium, for example, a CD (Compact Disc), a MD (Mini-Disc), a DVD (Digital Versatile Disc), a memory card, a Blu-ray Disc (registered trademark), and the like may be used.

The present disclosure contains subject matter related to that disclosed in Japanese Priority Patent Application JP 2010-251992 filed in the Japan Patent Office on Nov. 10, 2010, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing device, comprising:
  circuitry configured to:
    receive a connection request that is transmitted from a wireless terminal device configured to store contract authorization information of a first wireless provider of a plurality of wireless providers configured to provide a wireless connection service to the wireless terminal device via a wireless line,
      wherein the connection request is used to switch from a first application service to a second application service, which is different from the first application service, the connection request including first position information acquired by the wireless terminal device or second position information corresponding to a position of a base station to which the wireless terminal device is connected;

identify a location where the wireless terminal device exists;

extract wireless providers, from the plurality of wireless providers, configured to be able to provide the wireless connection service in the location based on the first or second position information included in the connection request;

select a second wireless provider, used in an event the first application service is provided to the wireless terminal device, from the extracted wireless providers based on content of the second application service;

transmit a Universal Subscriber Identity Module (USIM) information transmission request to the second wireless provider, wherein the second wireless provider is configured to receive the transmitted USIM information transmission request, and in response to receiving the transmitted USIM information transmission request, the second wireless provider is configured to transmit USIM information of the second wireless provider to the first wireless provider, wherein the first wireless provider is configured to transmit rewriting instruction information including the USIM information of the second wireless provider to the wireless terminal device; and control the wireless terminal device to rewrite the contract authorization information of the first wireless provider stored in the wireless terminal device by contract authorization information of the second wireless provider according to the USIM information of the second wireless provider.

2. The information processing device according to claim 1, wherein the first wireless provider is configured to, after receiving the USIM information of the second wireless provider, transmit the rewriting instruction information to the wireless terminal device to connect to a wireless line provided by the second wireless provider using the contract authorization information of the second wireless provider.

3. The information processing device according to claim 1, wherein the circuitry is further configured to:

specify the position of the wireless terminal device based on the first position information included in the connection request;

extract wireless providers configured to provide the wireless connection service at the specified position from the plurality of wireless providers; and select the second wireless provider from the extracted wireless providers.

4. The information processing device according to claim 1, wherein the circuitry is further configured to select the second wireless provider from the extracted wireless providers based on at least one or more of:

a cost related to the wireless connection service provided by the extracted wireless providers, wireless connection quality related to the wireless connection service, a congestion degree related to the wireless connection service, and the content of the second application service.

5. The information processing device according to claim 1, wherein the first and second application services are at least one or more of: a sound transmission service, an image transmission service, a web service, an e-mail service, a data download service, a data upload service, and a network game.

6. The information processing device according to claim 1, wherein the information processing device is an application service server, and wherein the circuitry is further configured to provide the second application service to the wireless terminal device through the wireless line or an aggregator configured to perform change of communication paths of the plurality of wireless providers.

7. The information processing device according to claim 1, wherein the circuitry is further configured to provide the second application service to the wireless terminal device by changing communication paths of the plurality of wireless providers.

8. The information processing device according to claim 7, wherein the circuitry is further configured to:

perform an authorization process of the connection request transmitted from the wireless terminal device; and change the communication paths of the first wireless provider and the second wireless provider.

9. The information processing device according to claim 1, wherein the circuitry is further configured to acquire wireless provider information from the first wireless provider and the second wireless provider.

10. The information processing device according to claim 1, wherein the connection request received from the wireless terminal device is based on a user operation to use the second application service.

11. A wireless terminal device, comprising:

circuitry configured to:

store contract authorization information of a first wireless provider of a plurality of wireless providers configured to provide a wireless connection service to the wireless terminal device via a wireless line;

transmit a connection request to an information processing device that is remote to the wireless terminal device, wherein the connection request is used to switch from a first application service to a second application service, which is different from the first application service, the connection request including first position information acquired by the wireless terminal device or second position information corresponding to a position of a base station to which the wireless terminal device is connected;

receive the second application service from the information processing device;

receive rewriting instruction information from the first wireless provider, wherein the rewriting instruction information is based on Universal Subscriber Identity Module (USIM) information of a second wireless provider, wherein the USIM information of the second wireless provider is transmitted to the first wireless provider by the second wireless provider, in response to a USIM information transmission request that is transmitted from the information processing device, and is received by the second wireless provider;

rewrite the contract authorization information of the first wireless provider stored by the circuitry by contract authorization information of the second wireless provider according to the rewriting instruction information, wherein the second wireless provider is selected from another plurality of wireless providers extracted from the plurality of wireless providers, in response to the connection request, based on the first or second position information and content of the second application service; and transmit another connection request by reconnection to the wireless line provided by the second wireless provider using the contract authorization information of the second wireless provider after the contract authorization information of the first wireless provider is rewritten.

12. The wireless terminal device according to claim 11, wherein the connection request is based on a user operation to use the second application service.

13. A communication system, comprising:
a wireless terminal device that includes a first circuitry configured to:
store contract authorization information of a first wireless provider of a plurality of wireless providers configured to provide a wireless connection service to the wireless terminal device via a wireless line; and
transmit a connection request to an information processing device that is remote to the wireless terminal device,
wherein the connection request, based on a user operation to switch from a first application service to a second application service, which is different from the first application service, includes first position information acquired by the wireless terminal device or second position information corresponding to a position of a base station to which the wireless terminal device is connected; and
the information processing device includes a second circuitry configured to:
receive the connection request transmitted from the wireless terminal device;
identify a location where the wireless terminal device exists;
extract wireless providers, from the plurality of wireless providers, configured to be able to provide the wireless connection service in the location based on the first or second position information included in the connection request;
select a second wireless provider, used in an event the first application service is provided to the wireless terminal device, from the extracted wireless providers based on content of the second application service;
transmit a Universal Subscriber Identity Module (USIM) information transmission request to the second wireless provider, wherein the second wireless provider is configured to receive the transmitted USIM information transmission request, and in response to receiving the transmitted USIM information transmission request, the second wireless provider is configured to transmit USIM information of the second wireless provider to the first wireless provider, wherein the first wireless provider is configured to transmit rewriting instruction information including the USIM information of the second wireless provider to the wireless terminal device; and
control the wireless terminal device to rewrite the contract authorization information of the first wireless provider stored in the wireless terminal device by contract authorization information of the second wireless provider according to the USIM information of the second wireless provider.

14. An information processing method performed by an information processing device including circuitry, the information processing method comprising:
receiving a connection request that is transmitted from a wireless terminal device configured to store contract authorization information of a first wireless provider of a plurality of wireless providers configured to provide a wireless connection service to the wireless terminal device via a wireless line,
wherein the connection request is used to switch from a first application service to a second application service, which is different from the first application service, the connection request including first position information acquired by the wireless terminal device or second position information corresponding to a position of a base station to which the wireless terminal device is connected;
extracting wireless providers, from the plurality of wireless providers, configured to be able to provide the wireless connection service to the wireless terminal device based on the first or second position information included in the connection request;
selecting a second wireless provider, used in an event the first application service is provided to the wireless terminal device, from the extracted wireless providers based on content of the second application service;
transmitting a Universal Subscriber Identity Module (USIM) information transmission request to the second wireless provider, wherein the second wireless provider is configured to receive the transmitted USIM information transmission request, and in response to receiving the transmitted USIM information transmission request, the second wireless provider is configured to transmit USIM information of the second wireless provider to the first wireless provider, wherein the first wireless provider is configured to transmit rewriting instruction information including the USIM information of the second wireless provider to the wireless terminal device; and
controlling, by the circuitry, the wireless terminal device to rewrite the contract authorization information of the first wireless provider stored within the wireless terminal device by contract authorization information of the second wireless provider according to the USIM information of the second wireless provider.

15. The information processing method according to claim 14, wherein the selection of the second wireless provider from the extracted wireless providers is based on at least one or more of:
a cost related to the wireless connection service provided by the extracted wireless providers, wireless connection quality related to the wireless connection service, a congestion degree related to the wireless connection service, and the content of the second application service.

16. The information processing method according to claim 14, wherein the connection request received from the wireless terminal device is based on a user operation to use the second application service.

* * * * *